Jan. 10, 1928. 1,655,503
E. KNOLLER
FRICTION GEAR
Filed March 29, 1924 2 Sheets-Sheet 1

Inventor
Erich Knoller,
by
Attorney

Jan. 10, 1928.  E. KNOLLER  1,655,503
FRICTION GEAR
Filed March 29, 1924   2 Sheets-Sheet 2

Inventor
Erich Knoller.
by A. B. Foster
Attorney

Patented Jan. 10, 1928.

1,655,503

UNITED STATES PATENT OFFICE.

ERICH KNOLLER, OF VIENNA, AUSTRIA.

FRICTION GEAR.

Application filed March 29, 1924, Serial No. 702,880, and in Austria April 10, 1923.

This invention relates to friction gearing.

In the ordinary forms of friction gearing great difficulty is experienced in obtaining enough pressure between driving and driven friction elements to prevent slipping and consequent wear.

One important object of the present invention is to provide a novel form of friction gearing wherein the different friction elements will, through their peculiar shape and arrangement, automatically produce adequate pressure to prevent slipping of such elements on each other.

Another difficulty with gearing of this description is that of allowing for inequalities in the machining of the gears and inaccuracies in their mountings.

A second important object of the invention is to provide an improved form of friction gearing wherein any such inequalities will be automatically compensated.

In the accompanying drawings like characters of reference indicate like parts in the several views, and:

Figure 1:
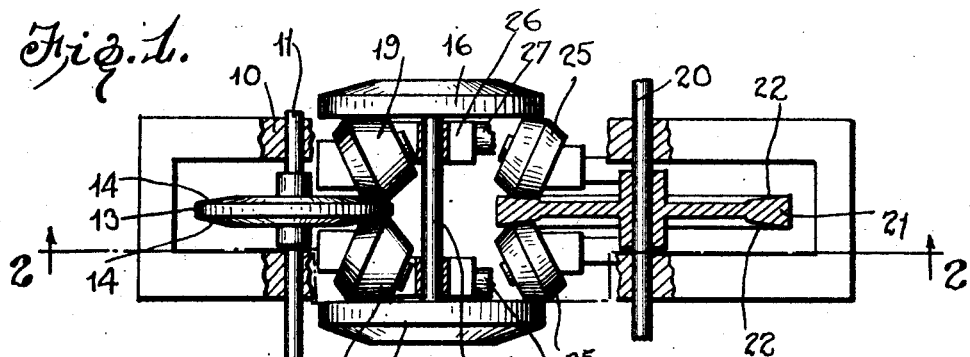
Figure 1 is a side elevation, partly in section of one form of friction gearing as constructed in accordance with this invention.
Figure 2:
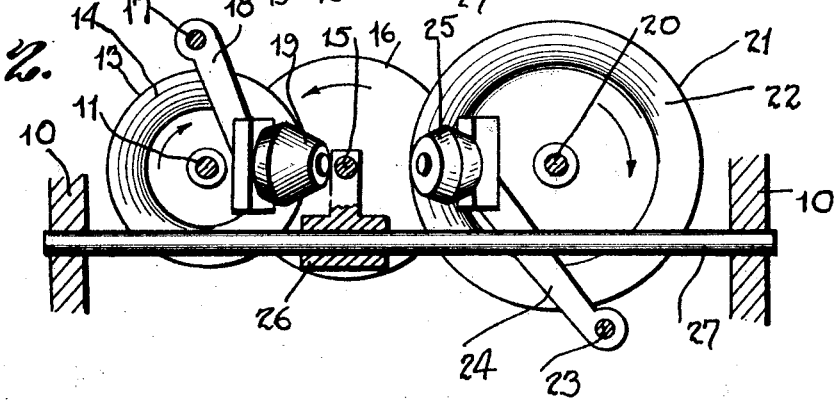
Figure 2 is a section on the line 2—2 of Figure 1.

From inspection of Figures 1 and 2 it will be seen that there is provided a frame 10 wherein is mounted a shaft 11 which is intended to revolve, under normal circumstances, in the direction of the arrow 12 in Figure 2. On this shaft 11 is fixedly mounted a member 13 having working faces provided with opposed beveled circular portions 14. Parallel to the shaft 11 there is mounted a shaft 15 carrying a pair of disks 16 having confronting faces constituting the working faces of this structure. Either of these shafts may be termed a driving shaft and the other may be termed the driven shaft so that these shafts together with their disks constitute respectively a driving and a driven element. Positioned to one side of the plane defined by the axes of the shafts 11 and 15 is a shaft 17 whereon is slidably and rotatably mounted a pair of arms 18 and on the free end of each of these arms is supported a friction idler 19 in the form of a double frusto-conical roller. It is to be understood that the form of this idler may be varied at will. Each of these idlers is interposed between cooperating working faces of the driving and driven elements and engages with the bevels 14. Moreover, the shaft 17 is so positioned that rotation of the disk 13 in the direction of the arrow tends to cause the friction idlers 19 to seek what may be termed the high portions of the bevels, those being the portions of the beveled element closest the working faces of the other element.

In order to use the device as a change speed gear there is provided a third shaft 20 whereon is mounted a disk 21 having opposed beveled working faces 22. Preferably this disk has the thickest portion of the bevel at its periphery. Mounted in a manner similar to the shaft 17 is a shaft 23 whereon is pivotally and slidably mounted a pair of arms 24 each carrying at its free end a revolubly mounted friction idler 25 which engages with the bevels 22 and the working faces of the disks 16. Under these circumstances the shaft 15 is mounted in a sliding frame 26 which is slidably supported on a rod 27 carried by the main frame 10, suitable means (not shown) being provided for shifting the frame on the shaft 27 and holding it in shifted position. Such means are old and well known and, as they form no specific part of the present invention are omitted from the showing.

With this construction it will be obvious that shifting the frame 26 will vary the point of engagement of the idlers 19 and 25 therewith so that the shafts 11 and 20 are frictionally connected for variable speeds.

Figure 3:
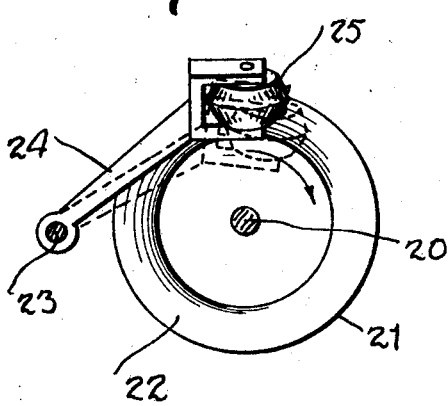
Figure 3 is a detail view showing one of the friction disks and an idler in plan, the idler being shown in one position in full lines and in a second position in dotted lines.
Figure 4:
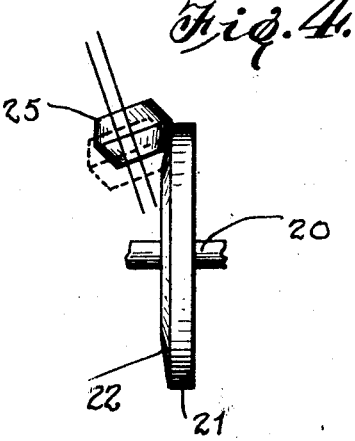
Figure 4 is a edge view of the details shown in Figure 3.

As shown in Figures 3 and 4 the idlers 19 swing in an arc across the working faces of the members 13 and, as they swing closer to the center or axis of the member 13 they climb the bevels 14 and are thus forced more firmly against the working faces of the members 16. In fact, experience has shown that the greater the resistance to the drive the greater will be the tendency of these members to climb the bevels and thus the greater will be the friction automatically produced. Moreover, due to the fact that the arms 18 are free to slide on the shaft 17 the idlers 19 accommodate themselves to any variations due to inexact machining or positioning of the driving and driven elements. Of course the idlers 25 operate in the same manner.

Figure 6:
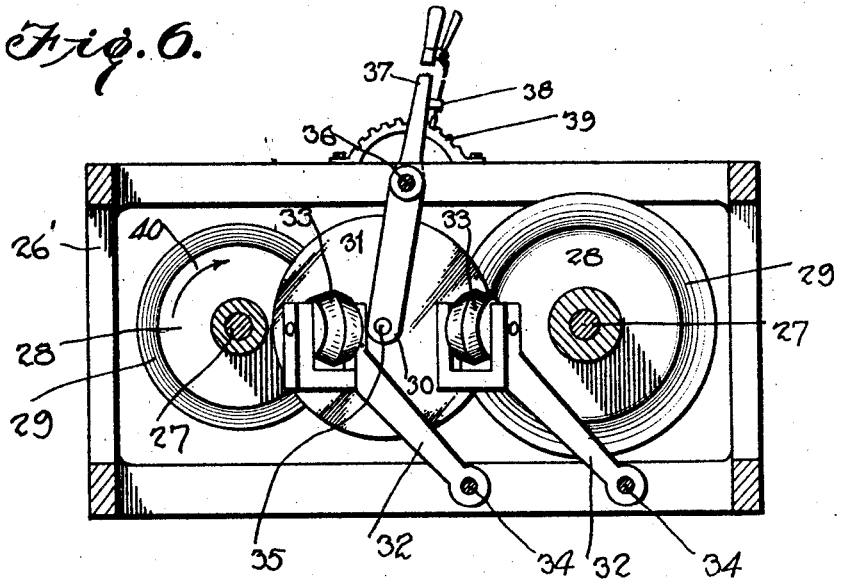
Figure 6 is a section on the line 6—6 of Figure 5.
Figure 5:
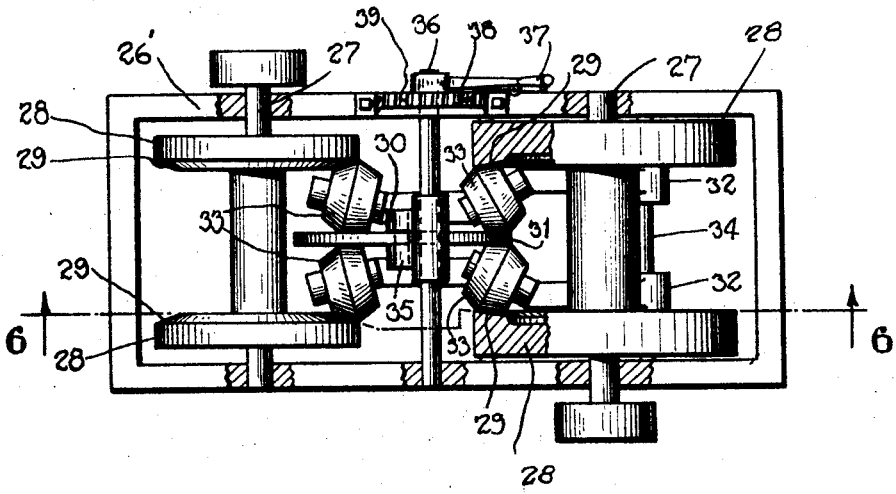
Figure 5 is a side elevation, partly in section of a modified form of the invention.

Referring now to Figures 5 and 6 it will be seen that in general exactly the same principle is involved. In this construction there is disclosed a frame 26' having parallel shafts 27 each of which carries a pair of disks 28 provided with beveled opposed working faces 29. A shaft 35 supports a relatively thin disk 31 having opposed working faces which are interposed in part between the working faces 29 of the disks 28, and pairs of arms 32 support friction idlers 33, these arms being rotatably and slidably mounted on eccentrically positioned shafts as in the former case. The shaft 35 is supported on a swinging frame 30 mounted on a shaft 36 from which extends an operating lever 37 provided with the usual latch 38 working over a common quadrant 39, this latch 38 and quadrant 39 being merely shown as indicating some suitable form of adjusting mechanism and not being specifically a part of this invention. The operation in this case is exactly the same as in the other. The shaft 27 has its normal revolution in the direction of the arrow 40 and the idlers, in operation, tend to climb the bevels just as before.

It is obvious that in some cases one of the shafts 20 or 27 with its corresponding disks and idlers may be omitted without departing from the spirit of the invention.

Having thus described the invention, what is claimed as new, is:

1. A friction gearing including driving and driven elements having parallel axes of rotation, one of said elements having a pair of working faces provided with opposed beveled circular portions, the other of said elements also having a pair of working faces, one of the elements having its working faces interposed in part between the working faces of the other element, friction idlers each interposed between the beveled portion of the respective working face of one element and a respective working face of the other element, and means to pivotally support said idlers to permit them to swing across said working faces, the pivotal axis of said means being positioned to one side of the plane in which the axes of said elements lies and so located that rotation of the driving element tends to cause the idlers to seek the portions of the bevels of one element closest the working faces of the other element.

2. A friction gearing including driving and driven gear elements having parallel axes of rotation, a third gear element having its axis parallel to the axes of the first element at least one of said elements having a pair of opposed beveled annular working faces, the remaining elements each having a pair of opposed working faces, the working faces of each element overlapping the working faces of an adjacent element in spaced relation thereto, friction idlers each interposed between the beveled working faces and the working faces overlapping said beveled working faces and connecting adjacent gear elements, and means to pivotally support said idlers to permit them to swing across their engaged working faces, each pivotal means being positioned to one side of the plane in which the axes of the elements connected by said idlers lies and so located that rotation of the driving element tends to cause the idlers to seek the portions of the bevels of one element closest the cooperating working faces of the adjacent element.

3. A friction gearing including driving and driven gear elements having parallel axes of rotation, a third gear element having its axis parallel to the axes of the first element at least one of said elements having a pair of opposed beveled annular working faces, the remaining elements each having a pair of opposed working faces, the working faces of each element overlapping the working faces of an adjacent element in spaced relation thereto, friction idlers each interposed between the beveled working faces and the working faces overlapping said beveled working faces and connecting adjacent gear elements, means to pivotally support said idlers to permit them to swing across their engaged working faces, each pivotal means being positioned to one side of the plane in which the axes of the elements connected by said idlers lies and so located that rotation of the driving element tends to cause the idlers to seek the portions of the bevels of one element closest the cooperating working faces of the adjacent element, one of said gear elements being disposed intermediate the other gear elements and engaged by all of said idlers, and means to shiftingly support the intermediate gear element arranged to permit movement of the axis of said element toward and from the axis of one of the remaining elements and from and toward the other of said remaining elements.

4. A friction gearing including a pair of co-axial spaced gear disks having their peripheral portions beveled on their confronting faces, a gear disk having its axis parallel to the first mentioned gear disks and having an edge portion interposed between edge portions of the first disks, a pair of idler wheels interposed between the faces of the second mentioned gear disk and the beveled portions of the first mentioned gear disks, and arms supporting said idler wheels and pivoted eccentrically of the axes of the gear disks and to one side of a plane containing said axes, the pivot of said arms being so positioned that rotation of the gear disks in forward directions tends to cause the idlers to seek the proximal portions of the bevels on said gear disks.

5. In a friction gear, a pair of disk gears consisting of a driving gear and a driven gear, an intermediate disk gear mounted between the first gears to move toward and from the driving gear and from and toward the driven gear, the intermediate gear being displaced laterally of the other gears and having its periphery overlapping the peripheries of the other gears, idlers interposed between and engaging the overlapped peripheral portions of said gears, and supports for said idlers arranged to hold the idlers yielding in position between the gears.

6. In a friction gear, a pair of disk gears consisting of a driving gear and a driven gear, an intermediate disk gear mounted between the first gears to move toward and from the driving gear and from and toward the driven gear, the intermediate gear being displaced laterally of the other gears and having its periphery overlapping the peripheries of the other gears, idlers interposed between and engaging the overlapping peripheral portions of said gears, arms carrying said idlers at one end, and pivotal supports for the remaining ends of said arms.

7. In a friction gear, a pair of disk gears consisting of a driving gear and a driven gear, an intermediate disk gear mounted between the first gears to move toward and from the driving gear and from and toward the driven gear, the intermediate gear being displaced laterally of the other gears and having its periphery overlapping the peripheries of the other gears, idlers interposed between and engaging the overlapping peripheral portions of said gears, the idler engaged portions of the pair of gears being beveled with the bevel of one gear reversely directed with respect to the bevel of the other gear, and supports for said idlers arranged to hold the idlers yielding in position between the gears.

8. In a friction gear, a pair of disk gears consisting of a driving gear and a driven gear, an intermediate disk gear mounted between the first gears to move toward and from the driving gear and from and toward the driven gear, the intermediate gear being displaced laterally of the other gears and having its periphery overlapping the peripheries of the other gears, idlers interposed between and engaging the overlapping peripheral portions of said gears, the idler engaged portions of the pair of gears being beveled with the bevel of one gear reversely directed with respect to the bevel of the other gear, arms carrying said idlers at one end, and pivotal supports for the remaining ends of said arms.

In testimony whereof I have signed my name to this specification.

ING. DR. ERICH KNOLLER.